United States Patent
Ben-Shachar et al.

(10) Patent No.: US 6,208,996 B1
(45) Date of Patent: Mar. 27, 2001

(54) MOBILE DEVICE HAVING NOTIFICATION DATABASE IN WHICH ONLY THOSE NOTIFICATIONS THAT ARE TO BE PRESENTED IN A LIMITED PREDETERMINED TIME PERIOD

(75) Inventors: Ido Ben-Shachar, Redmond; Scott A. Skorupa, Newcastle; Garrett R. Vargas, Kirkland; John I. Ferrell, Clinton, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/035,643

(22) Filed: Mar. 5, 1998

Related U.S. Application Data

(60) Provisional application No. 60/070,998, filed on Nov. 5, 1997, now abandoned.

(51) Int. Cl.$^7$ ........................................... G06F 17/00
(52) U.S. Cl. .................. 707/104; 705/8; 705/9; 345/963
(58) Field of Search ...................... 707/1–9, 10, 100–104, 707/200–206, 511, 531, 532–533, 541; 708/110, 112, 130; 709/103, 217; 713/321, 400, 500, 502, 600; 345/350, 963; 705/8–10

(56) References Cited

U.S. PATENT DOCUMENTS

| | | | |
|---|---|---|---|
| 4,780,839 | * 10/1988 | Hirayama | 708/160 |
| 5,199,104 | * 3/1993 | Hirayama | 345/350 |
| 5,289,393 | * 2/1994 | Kaya | 708/112 |
| 5,347,579 | * 9/1994 | Blandford | 713/176 |
| 5,392,390 | 2/1995 | Crozier | 345/335 |
| 5,493,693 | 2/1996 | Tanaka et al. | 455/403 |
| 5,519,606 | 5/1996 | Frid-Nielsen et al. | 705/9 |
| 5,548,753 | 8/1996 | Linstead et al. | 707/1 |
| 5,552,586 | * 9/1996 | Kalman | 235/380 |
| 5,555,376 | 9/1996 | Theimer et al. | 709/229 |
| 5,630,081 | 5/1997 | Rybicki et al. | 345/349 |
| 5,664,175 | * 9/1997 | Jackson et al. | 707/7 |
| 5,684,990 | * 11/1997 | Boothby | 707/203 |
| 5,701,423 | 12/1997 | Crozier | 345/335 |
| 5,845,257 | * 12/1998 | Fu et al. | 705/8 |
| 5,936,625 | * 8/1999 | Kahl et al. | 345/351 |
| 5,946,687 | * 8/1999 | Gehani et al. | 707/10 |
| 5,953,734 | * 9/1999 | Tanaka | 707/541 |

* cited by examiner

*Primary Examiner*—John Breene
*Assistant Examiner*—Srirama Channavajjala
(74) *Attorney, Agent, or Firm*—Westman, Champlin & Kelly, P.A.

(57) ABSTRACT

A system is provided for maintaining a notification database in a mobile device. A notification scheduling program is run at a predetermined time. The notification scheduling program is configured to obtain information indicative of a plurality of notifications to be presented in the future. The notifications which are to be presented within a predetermined time period are entered in the notification database. The notification scheduling program is scheduled to run in response to expiration of the predetermined time period.

21 Claims, 10 Drawing Sheets

MOBILE DEVICE HAVING NOTIFICATION DATABASE IN WHICH ONLY THOSE NOTIFICATIONS THAT ARE TO BE PRESENTED IN A LIMITED PREDETERMINED TIME PERIOD

REFERENCE TO CO-PENDING PATENT APPLICATION

Reference is hereby made to the following co-pending U.S. patent applications: Ser. No. 09/058,679, filed Apr. 10, 1998, entitled "GENERATING MEETING REQUESTS AND GROUP SCHEDULING FROM A MOBILE DEVICE", currently pending; application Ser. No. 09/058,685, filed Apr. 10, 1998, entitled "INTEGRATED COMMUNICATIONS ARCHITECTURE ON A MOBILE DEVICE", currently pending; application Ser. No. 09/058,031, filed Apr. 10, 1998, entitled "SYSTEM AND METHOD FOR MANAGING APPLICATION INSTALLATION FOR A MOBILE DEVICE", currently pending; and provisional application Ser. No. 60/064,986, filed Nov. 7, 1997, entitled "FEATURES OF A MOBILE DEVICE AND ASSOCIATED COMPUTER", now abandoned; all of which are assigned to the same assignee as the present application.

BACKGROUND OF THE INVENTION

Mobile devices are small electronic computing devices often referred to as personal digital assistants. One such mobile device is sold under the trade name Handheld PC (or "H/PC") by Microsoft Corporation of Redmond, Wash. While a wide variety of computing tasks and applications can be performed by such mobile devices, personal information managers (PIMs) are particularly well suited to mobile devices.

PIMs typically comprise applications which enable the user of the mobile device to better manage scheduling and communications, and other such tasks. Some commonly available PIMs include scheduling and calendar programs, task lists, address books, electronic mail (e-mail) programs, and clock programs which allow the user to set alarms to be actuated at certain times of the day. Some commonly commercially available PIMs are sold under the brand names Microsoft Schedule+ and Microsoft Outlook and are commercially available from Microsoft Corporation of Redmond, Wash.

It is also common for mobile devices to be used in conjunction with a desktop computer. For example, the user of a mobile device may also have access to, and use, a desktop computer at work, at home, or both. A user may typically run the same types of PIMs on both the desktop computer and the mobile device (although the particular versions of the PIMs may be somewhat different from the desktop computer to the mobile device). Thus, it is quite advantageous for the mobile device to be designed to be couplable to the desktop computer to exchange information with, and share information with, the mobile device.

The user may also typically make changes to the PIMs both on the mobile device, and at the desktop. Therefore, it is advantageous for the PIMs on both the mobile device and the desktop to contain the most up-to-date information, regardless of whether recent changes to the PIMs have been made on the mobile device or the desktop computer. The process of coupling the mobile device with the desktop computer, and integrating the information stored by the PIMs on the mobile device and the desktop computer such that the two contain the same updated information is referred to as synchronization.

Conventional PIMs which support electronic calendaring and scheduling features (collectively referred to as a scheduler, or as a scheduling application) are traditionally supported on desktop computers. Such PIMs provide the ability of the user to schedule a meeting request for one or more desired attendees. Such PIMs also typically allow the user to enter appointments on a calendar, and to set user notifications related to the appointments. For instance, some PIMs allow the user to set a notification which notifies the user audibly, visually, or both, of an impending meeting. Such PIMs also conventionally support clock programming which allows the user to enter alarms which can be conveyed to the user at certain times of the day. Such alarms, as with appointment notifications, typically provide the user with either audible or visual indicia, or both, at a specified time during the day. The user notifications related to appointments or calendaring and clock events are referred to herein as clock and calendar notifications.

Significant obstacles present themselves in attempting to implement an efficient and versatile clock and calendar notification system on a mobile device. Mobile devices are typically battery powered and have significantly limited memory capacity relative to desktop or laptop computers. It is not uncommon for users of mobile devices to have several appointments each day (all of which would desirably carry with them a corresponding user notification) and to set several clock alarms each day. Maintaining clock and calendar notifications for such a user would consume an undesirably high amount of memory and power, even if only maintaining such notifications several weeks into the future (much less several months or years into the future).

SUMMARY OF THE INVENTION

A system is provided for maintaining a notification database in a mobile device. A notification scheduling program is run at a predetermined time. The notification scheduling program is configured to obtain information indicative of a plurality of notifications to be presented in the future. The notifications which are to be presented within a predetermined time period are entered in the notification database. The notification scheduling program is scheduled to run in response to expiration of the predetermined time period.

DETAILED DESCRIPTION OF THE PREFERRED EMBODIMENTS

Overview of Environment

Figure 1:
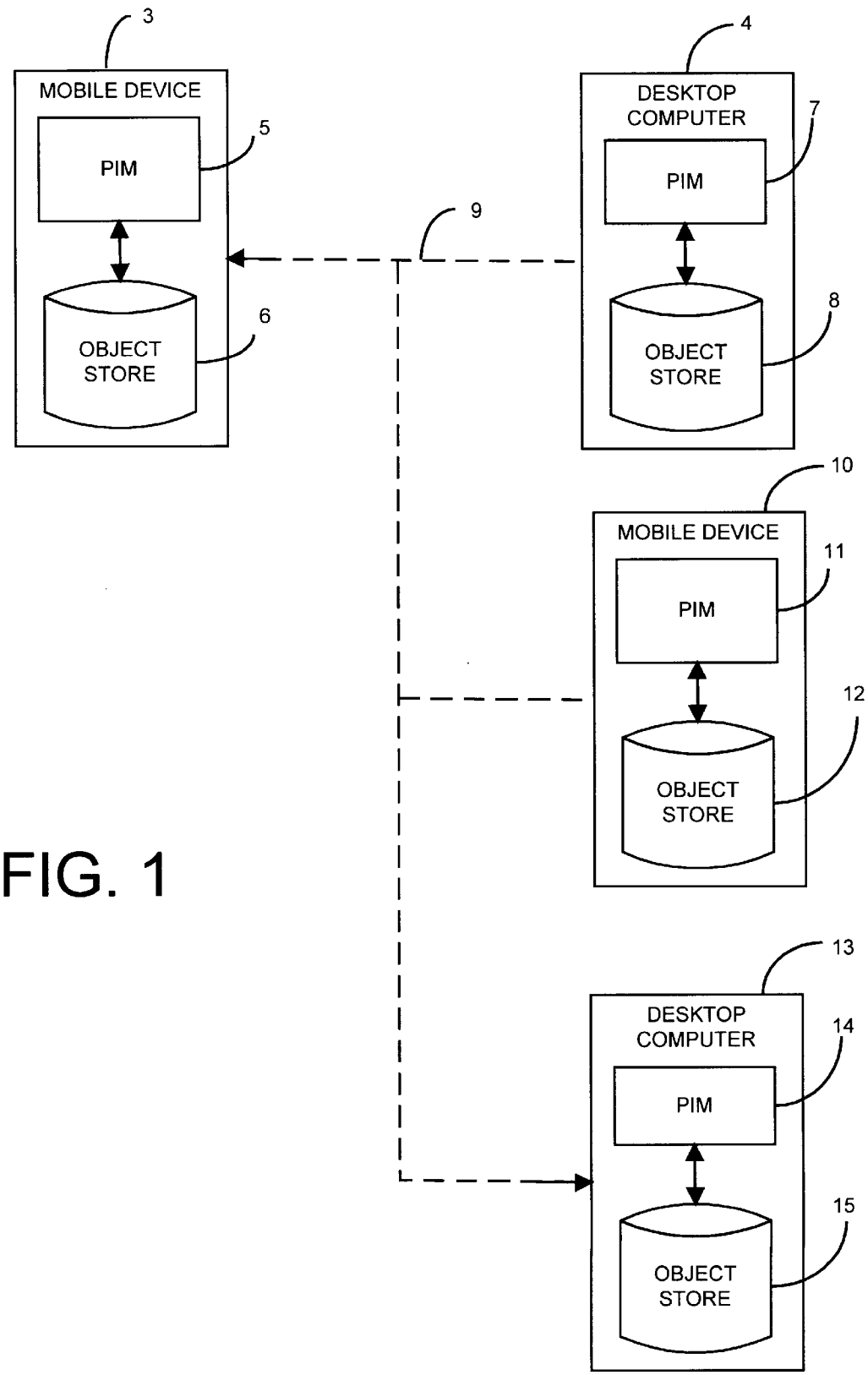
FIG. 1 is a block diagram illustrating a basic environment of the present invention.

FIG. 1 is a block diagram of a typical system or environment 2 in which the present invention operates. Environment 2 includes mobile device 3 and desktop computer 4. FIG. 1 also illustrates that mobile device 3 can optionally be separately coupled to another mobile device 10 or another desktop computer 13.

Mobile device 3 includes an application program 5 and an object store 6. Desktop computer 4 also includes an application program 7 and an object store 8. Mobile device 10 includes an application program 11 and object store 12. Further, desktop computer 13 includes an application program 14 and an object store 15.

Mobile device 3 is couplable to desktop computer 4, mobile device 10 or desktop computer 13 by one of a plurality of connection mechanisms 9. The operation of desktop computers 4 and 13 and the operation of mobile devices 3 and 10 are preferably similar. Therefore, for the sake of simplicity, the present description proceeds only with respect to mobile device 3 and desktop computer 4.

In one preferred embodiment of the present invention, application program 7 on desktop 4 is a personal information manager (PIM) which supports electronic mail messaging, scheduling, calendaring, clock features and an address book containing contact information. Of course, PIM 7 can be configured to support a wide variety of other features, such as task lists and personalized address books, to name a few. However, for the sake of clarity, only features relating to scheduling and calendaring, and clock functions, are discussed in detail with respect to the present invention.

Object store 8 is a memory which is configured to store a plurality of individual records or objects, each comprising a plurality of fields or properties related to the above-mentioned features. In one preferred embodiment, PIM 7 is a database program, such as that available under the commercial designation Microsoft Outlook 97, and object store 8 is configured to store objects, each of which has a plurality of properties associated with electronic mail messaging, scheduling and calendaring, and contact information.

The application program designated as PIM 5 for mobile device 3 is a similar PIM to that stored on desktop computer 4. Object store 6 on mobile device 3 is configured to store a plurality of individual records or objects, each comprising a plurality of fields or properties related to the above-mentioned, supported features. As with PIM 7, PIM 5 can also support a wide variety of other features. However, for the sake of clarity, only those features related to the present invention are discussed in detail herein.

In the preferred embodiment, each object in object store 6 comprises the same set of properties stored in object store 8 for related messages, or a subset of those properties. Mobile device 3 executes PIM 5 to maintain the objects in object store 6.

In the preferred embodiment, each object stored in object store 8 is also stored in object store 6. However, there are actually two instances of each object (one in object store 6 and one in object store 8). Thus, when a user changes one instance of the object stored in either store 6 or store 8, the second instance of that object in the other of stores 6 and 8 is preferably updated the next time mobile device 3 is connected to desktop computer 4 so that both instances of the same object contain up-to-date data. This is referred to as synchronization.

In order to accomplish synchronization, synchronization components run on both mobile device 3 and desktop computer 4. The synchronization components communicate with PIMs 5 and 7 on mobile device 3 and desktop computer 4 through well defined interfaces to manage communication and synchronization.

The components of mobile device 3 and desktop computer 4 communicate with each other through any suitable, and commercially available, communication link 9, and using a suitable communications protocol. For instance, in one preferred embodiment, mobile device 3 is connectable to desktop computer 4 with a physical cable which communicates using a serial communications protocol. Other communication mechanisms are also contemplated by the present invention, such as infrared (IR) communication, direct modem communication, remote dial-up networking communication, communication through commercially available network cards (i.e., using TCP/IP), remote access services (RAS), wireless modem, wireless cellular digital packet data (CDPD), or other suitable communication mechanisms.

Overview of Desktop Computer 4

Figure 2:
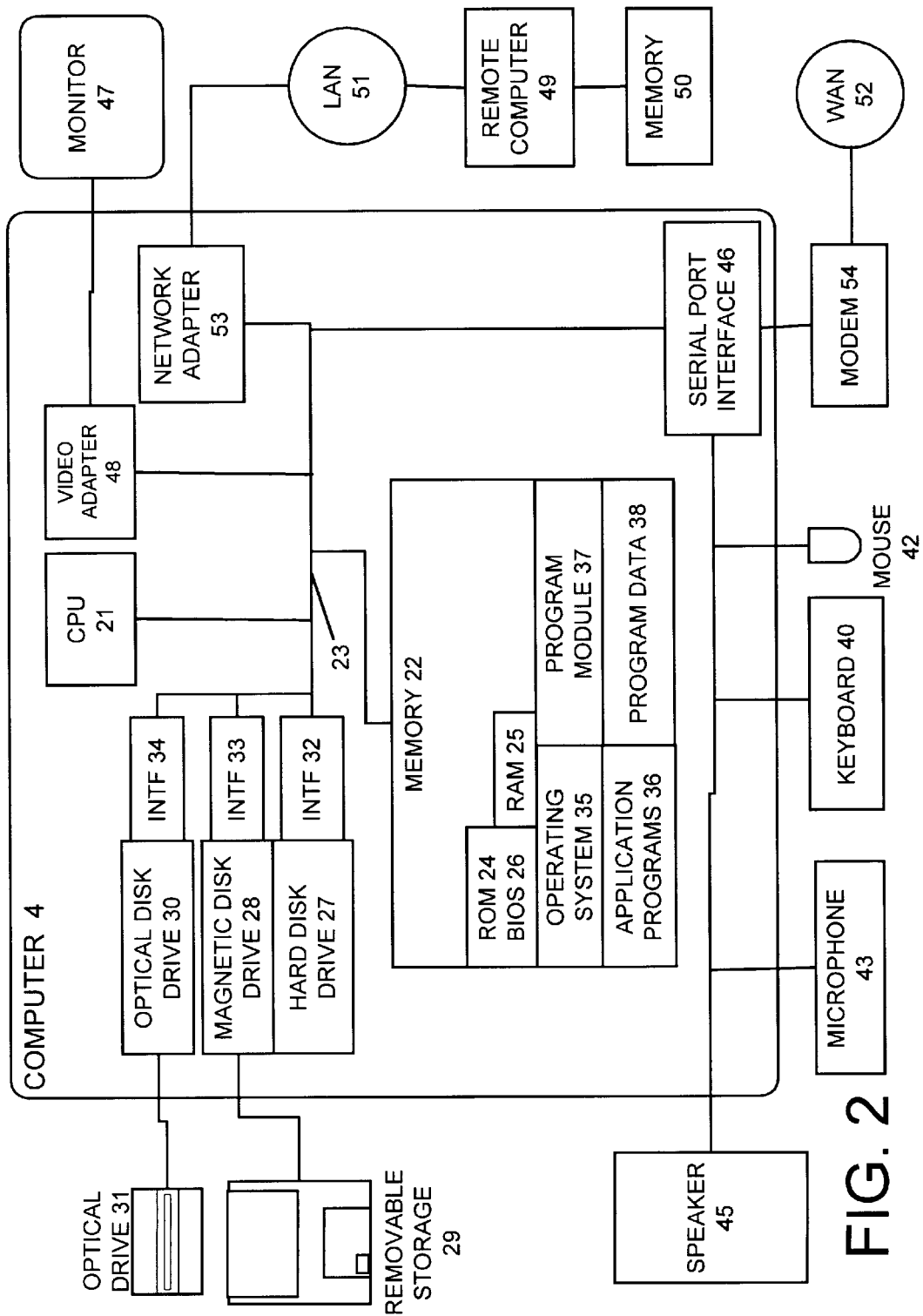
FIG. 2 is a block diagram of one embodiment of a conventional desktop computer used in conjunction with a mobile device in accordance with the present invention.

FIG. 2 and the related discussion are intended to provide a brief, general description of a suitable desktop computer 4. A more detailed discussion is provided in the above-identified patent applications which are incorporated.

With reference to FIG. 2, an exemplary system for implementing desktop computer 4 includes a general purpose computing device in the form of a conventional personal computer 4, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further preferably includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the desktop computer 4.

A number of program modules may be stored on the hard disk, magnetic disk 29, optical disk 31, ROM 24 or RAM 25, including an operating system 35, one or more application programs 36 (which include PIMs 7), other program modules 37, and program data 38. A user may enter commands and information into the desktop computer 4 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48.

The desktop computer 4 may operate in a networked environment using logic connections to one or more remote computers (other than mobile device 3), such as a remote computer 49. The remote computer 49 may be another personal computer, a server, a router, a network PC, a peer device or other network node, and typically includes many or all of the elements described above relative to desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprisewide computer network intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to desktop computer 4, or portions thereof, may be stored in the remote memory storage devices.

Desktop computer 4 runs operating system 35 that is typically stored in non-volatile memory 24 and executes on the processor 21. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. PIM 7 is preferably stored in program module 37, in volatile memory or non-volatile memory, or can be loaded into any of the components shown in FIG. 2 from a floppy diskette 29, CDROM drive 31, downloaded from a network via network adapter 53, or loaded using another suitable mechanism.

A dynamically linked library (DLL), comprising a plurality of executable functions is associated with PIM 7 for execution by processor 21. Interprocessor and intercomponent calls are facilitated using the component object model (COM) as is common in programs written for Microsoft Windows brand operating systems.

Mobile Device 3

Figure 3:
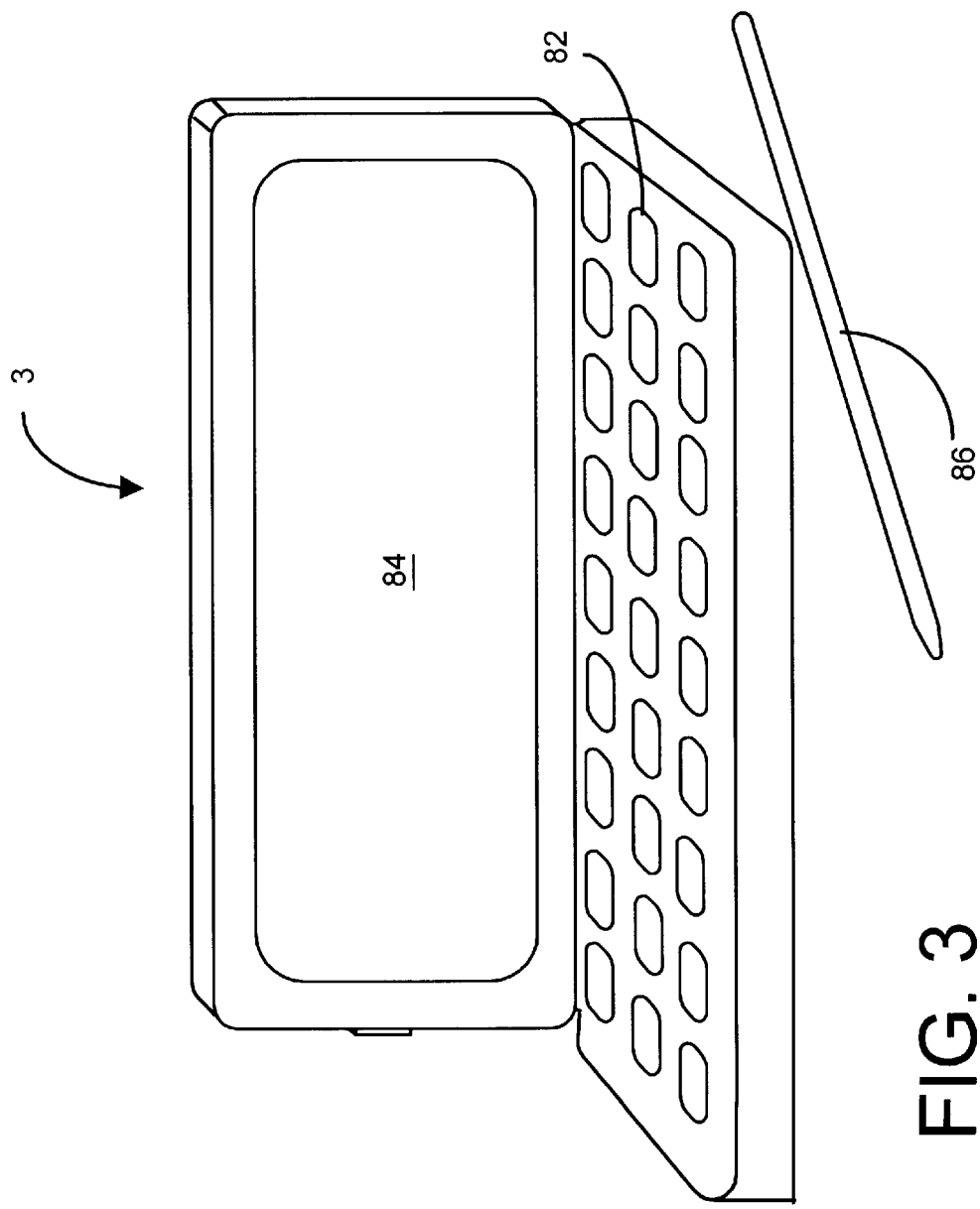
FIG. 3 is a simplified pictorial illustration of one embodiment of a mobile device in accordance with the present invention.

FIG. 3 is a pictorial illustration of one preferred embodiment of a mobile device 3 which can be used in accordance with the present invention. Mobile device 3, in one preferred embodiment, is a digital assistant sold under the designation H/PC by Microsoft Corporation. Mobile device 3 has some components which are similar to those of desktop computer 4. For instance, in one preferred embodiment, mobile device 3 includes a miniaturized keyboard 82, display 84, and stylus 86.

In the embodiment shown in FIG. 3, display 84 is a liquid crystal display (LCD) which uses a contact-sensitive display screen in conjunction with stylus 86. Stylus 86 is used to press or contact the display 84 at designated coordinates to accomplish certain user input functions. Of course, other user input configurations can be used as well. For example, user input mechanisms could be included such as a keypad, a track ball, and other various types of miniaturized keyboards, or the like. In addition, mobile device 3 may not be embodied as the Microsoft H/PC brand of digital assistant, but could also be implemented as another type of personal digital assistant (PDA), another personal organizer, a palm top computer, or a similar computerized notepad device.

Figure 4:
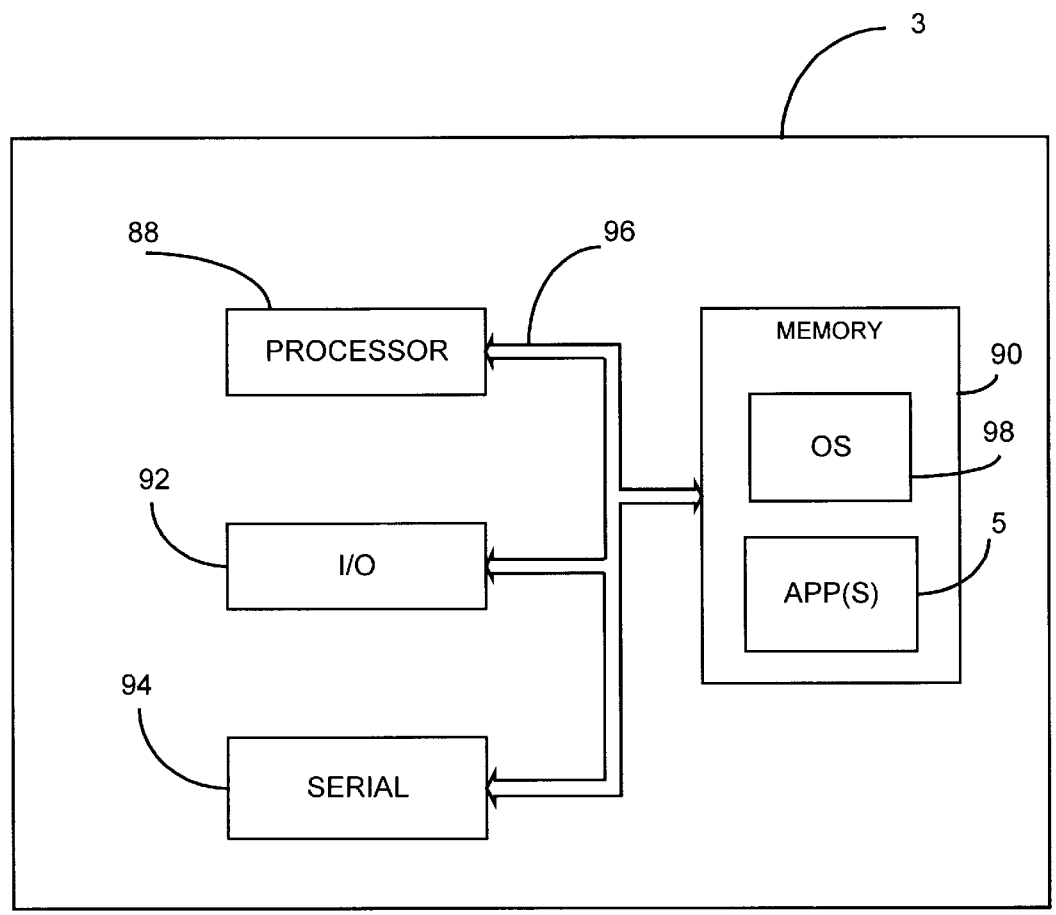
FIG. 4 is a simplified block diagram of one embodiment of the mobile device shown in FIG. 3.

FIG. 4 is a more detailed block diagram of mobile device 3. Mobile device 3 preferably includes microprocessor 88, memory 90, input/output (I/O) components 92 (which include keyboard 82 and touch sensitive screen 84) and serial interface 94. In the preferred embodiment, these components of mobile device 3 are coupled for communication with one another over a suitable bus 96.

In the preferred embodiment, memory 90 is implemented as non-volatile electronic memory such as a random access memory (RAM) with a battery back-up module (not shown) such that information stored in memory 90 is not lost when the general power to mobile device 30 is shut down. A portion of memory 90 is preferably allocated as addressable memory for program execution, while the remaining portion of memory 90 is preferably used to simulate storage on a disk drive.

Memory 90 includes operating system 98 and application (or PIM) 5. Operating system 98, during operation, is preferably loaded into, and executed by, processor 88 from memory 90. Operating system 98, in one preferred embodiment, is the Windows CE brand operating system commercially available from Microsoft Corporation. The operating system 98 is preferably designed for mobile devices, and implements database features which can be utilized by PIM 5 through a set of exposed application programming interfaces and methods. The objects in object store 6 are preferably maintained by PIM 5 and operating system 98, at least partially in response to calls to the exposed application program interfaces and methods.

Notifications and Notification Scheduling

PIMs 5 and 7 preferably support calendar applications which allow the user to enter an appointment, and an associated user notification. The user notification may typically be an audible or visual indicia (or both) which is presented to the user at a predesignated time before the appointment. Further, PIMs 5 and 7 preferably support clock features which allow the user to set alarms. The alarms, as with the calendar notifications, preferably provide the user with an audible or visual indicia (or both) at a time for which the alarm is set.

In order to set a clock alarm notification or a calendar notification, the user typically enters the time associated with the notification and the type of notification desired into mobile device 3. The application receiving that information (i.e., the clock application or the calendar application) then typically calls an application programming interface CES- ETUSERNOTIFICATION which is exposed by operating system 98 which causes the operating system to provide the user with a desired user indicia at the indicated time.

All notifications are stored in a large database. A notification engine supported by the operating system 98 accesses the information in that database and determines which notification or alarms should be actuated at the present time. When this notification system runs, its speed is directly related to the number of entries maintained in the notification database. Also, the memory consumed by the notification system is also directly related to the number of entries maintained in the notification database.

In addition, the calendar and clock application programs, which allow the user to set such notifications and alarms, are typically large and memory intensive applications. Thus, launching of such applications can lead to degradation in the performance of mobile device 3 due to the memory and power consumption corresponding to such applications. Further, users of mobile device 3 may desire clock-related alarms to go off every day, at the same time.

Therefore, a user of mobile device 3 may desire the device to maintain a great many notifications. However, for a mobile device 3 to carry a great many user notification entries in the notifications database can be undesirably time consuming and power consuming, particularly where such notifications stretch forward over a period of several weeks, months or years.

Thus, in accordance with one preferred embodiment of the present invention, a notification scheduling system maintains all desired user notifications, without making an undesirably large number of entries in the notifications database and without consuming an undesirably large amount of power. Briefly, in accordance with one preferred aspect of the present invention, a clock notification scheduling system is provided which obtains a list of the specific clock alarms which are to be reset every day and schedules notifications associated with those alarms for a predetermined time period in the future (henceforth, the predetermined time period will be discussed in terms of one week, although it could be any desirable predetermined time period). In accordance with another preferred aspect of the present invention, a calendar notification scheduling system is provided which schedules calendar notifications, corresponding to appointments which are received by the calendar application program, for a predetermined time into the future.

By actually scheduling the clock and calendar notifications for only a predetermined, and preferably relatively short, time period into the future, the present invention obtains a number of advantages. First, the notification scheduling program itself need only be run periodically. This conserves power. In addition, the number of notifications scheduled by the notification system is limited to those required during the predetermined time period. This significantly reduces storage which would otherwise be required by such a system if all notifications for a long time into the future were to be entered into the notifications database and maintained at all times. This also increases the speed at which the notification engine processes the notifications.

Figure 5:
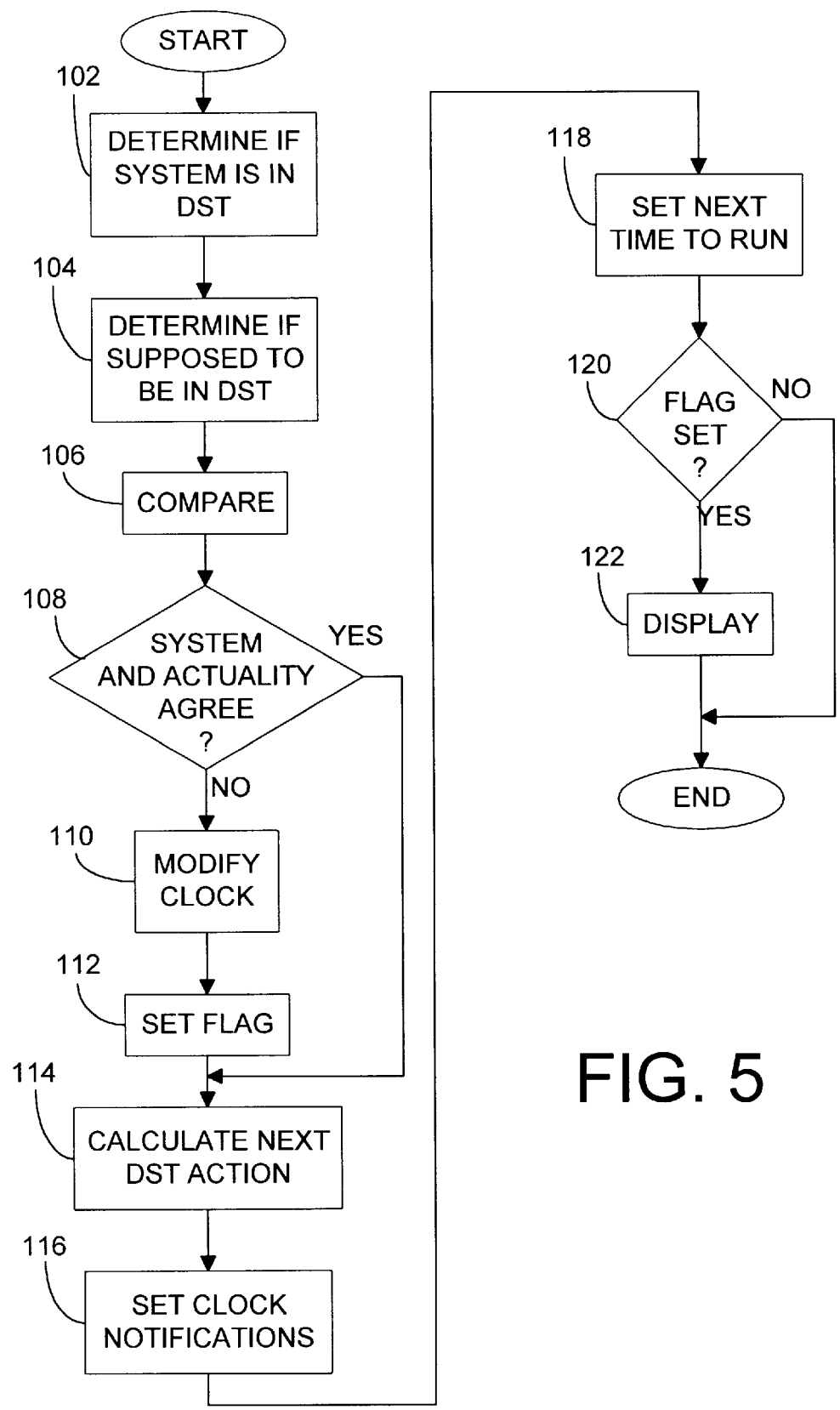
FIG. 5 is a flow diagram illustrating one preferred embodiment of a clock notification scheduling system in accordance with one aspect of the present invention.

FIG. 5 is a flow diagram which illustrates the operation of one preferred embodiment of a clock notification scheduling system (or application) in accordance with one aspect of the present invention.

In the preferred embodiment, two application programming interfaces exposed by the operating system 98 of mobile device 3 are used in order to set the time or events which cause the clock notification scheduling application to run. The two application programming interfaces (APIs) include CERUNAPPATTIME and CERUNAPPATEVENT. These application programming interfaces are well documented in literature describing the Windows CE operating system.

Briefly, the API CERUNAPPATTIME allows the programmer to specify a time and an executable program. The operating system launches that executable program at that time. The API CERUNAPPATEVENT allows the programmer to specify an event and an executable program. The operating system launches that program upon the occurrence of the specified event.

There are a number of things which can preferably cause the clock notification scheduling application described in FIG. 5 to run. Of course, the program will be launched at the next time it is scheduled to run (which may be a daylight savings time transition). Some events which will preferably cause the operating system to launch the clock notification scheduling program include the time on mobile device 3 being changed, mobile device 3 being docked (connected to desktop computer 4), a backup and restore operation, or a disruption of power to mobile device 3. Of course, any other suitable event can also be used to trigger the launching of the clock notification scheduling program.

Upon being launched, there is no indication set as to exactly why the clock notification scheduling application has been launched. Therefore, the clock notification scheduling application first determines whether a daylight savings time event has taken place which requires modification of the clock on mobile device 3.

In doing this, the clock notification scheduling program first determines whether the operating system contains information indicating that it is operating in accordance with daylight savings time. This is indicated by block 102 in FIG. 5. Next, the clock notification scheduling application determines whether the system is supposed to be operating in daylight savings time, given the present time and date. This is indicated by block 104. In order to obtain the information in blocks 102 and 104, the clock notification scheduling program calls an API exposed by the operating system to access the registry maintained by the operating system. The registry contains the information indicative of whether the system is operating in daylight savings time. The registry also contains information indicative of the dates upon which daylight savings time is to be entered and exited. Based on this information, it can be determined whether the system is operating in daylight savings time, and whether the system is actually supposed to be operating in daylight savings time.

Those two items are compared in block 106. In other words, it is determined whether the system is in agreement with what is supposed to be happening. If (for example) the system is operating in daylight savings time, and it is determined that the system is supposed to be operating in daylight savings time, then no modifications to the clock need to be made. In other words, the clock is properly set for daylight savings time.

By the same token, if the system is operating on standard time, and it is supposed to be operating on standard time, again no clock modifications are required. Therefore, processing continues at block 114.

However, if the system is either operating in daylight savings time or standard time, but it is supposed to be operating in the other, then the clock notification program determines that it was launched because a daylight savings time transition has occurred, and the clock needs to be modified. Thus, the clock is switched by one hour in the appropriate direction. This is indicated by blocks 108 and 110. Also, if the clock is modified, a flag is set. This is indicated by block 112 and will be described in greater detail below.

Once it has been determined whether the clock needs to be modified based on daylight savings time (and if so, once the appropriate modification has been made), the system calculates when the next action will be required due to a daylight savings time transition. This will be described in greater detail with respect to FIG. 6. Basically, however, the system calculates the next date that the clock will need to be modified based on a daylight savings time transition (either into or out of daylight savings time). The system determines whether the transition will be from daylight savings time to standard time or vise versa, and determines the exact date and time at which that transition is to occur. This is indicated by block 114.

The system then schedules clock alarm notifications. This will also be described in greater detail with respect to FIG. 7. Briefly, however, the system first identifies all of the alarms that are set to be actuated for the present day, and identifies the specific time at which each alarm is set to be actuated. For each alarm, the system makes an entry in the notification database scheduling the alarm to go off on the present day, then adds one day to the time identified and makes another entry in the notification database which schedules the alarm to go off exactly one day later as well. This process continues (i.e., the system adds an additional day to the time identified and schedules the alarm to go off a day later) for a predetermined number of days into the future such that each of the alarms is set to go off at the same time, each day, for a predetermined time period into the future. In one preferred embodiment, the predetermined time period is one week. Thus, for each alarm, the system makes an entry in the notification database which schedules the alarm to go off at a given time on a first day, then adds one day to that time and makes an additional entry in the notification database which sets the alarm to go off at that time on the following six additional days. Setting of the clock notifications is indicated by block 116.

The next action taken by the clock notification scheduling application is to determine when it is to be run next, and to schedule itself to be launched by the operating system at that time. This is indicated in greater detail with respect to FIG. 8. Briefly, however, the clock notification application takes the current time and day, and adds seven days to that value (or adds the appropriate other predetermined time interval for which the clock notifications are to be set). The system then compares the results of that addition with the date that the next daylight savings time transition is to occur as calculated in block 114. The clock notification scheduling application then schedules itself to be launched by the operating system at the earliest of those two dates. Setting the next time which the application is to be launched is indicated by block 118.

Finally, in one preferred embodiment, where the system has altered the clock due to a daylight savings time transition, it is preferred that the system notify the user that the clock has been altered. Therefore, the notification scheduling system examines the flag which was set in block 112. If the flag was set, the system displays an appropriate user interface indicating that the clock has been modified due to a daylight savings time transition. If the flag is not set, then no modification has been made and the system simply terminates processing. This is indicated by blocks 120 and 122.

Figure 6:
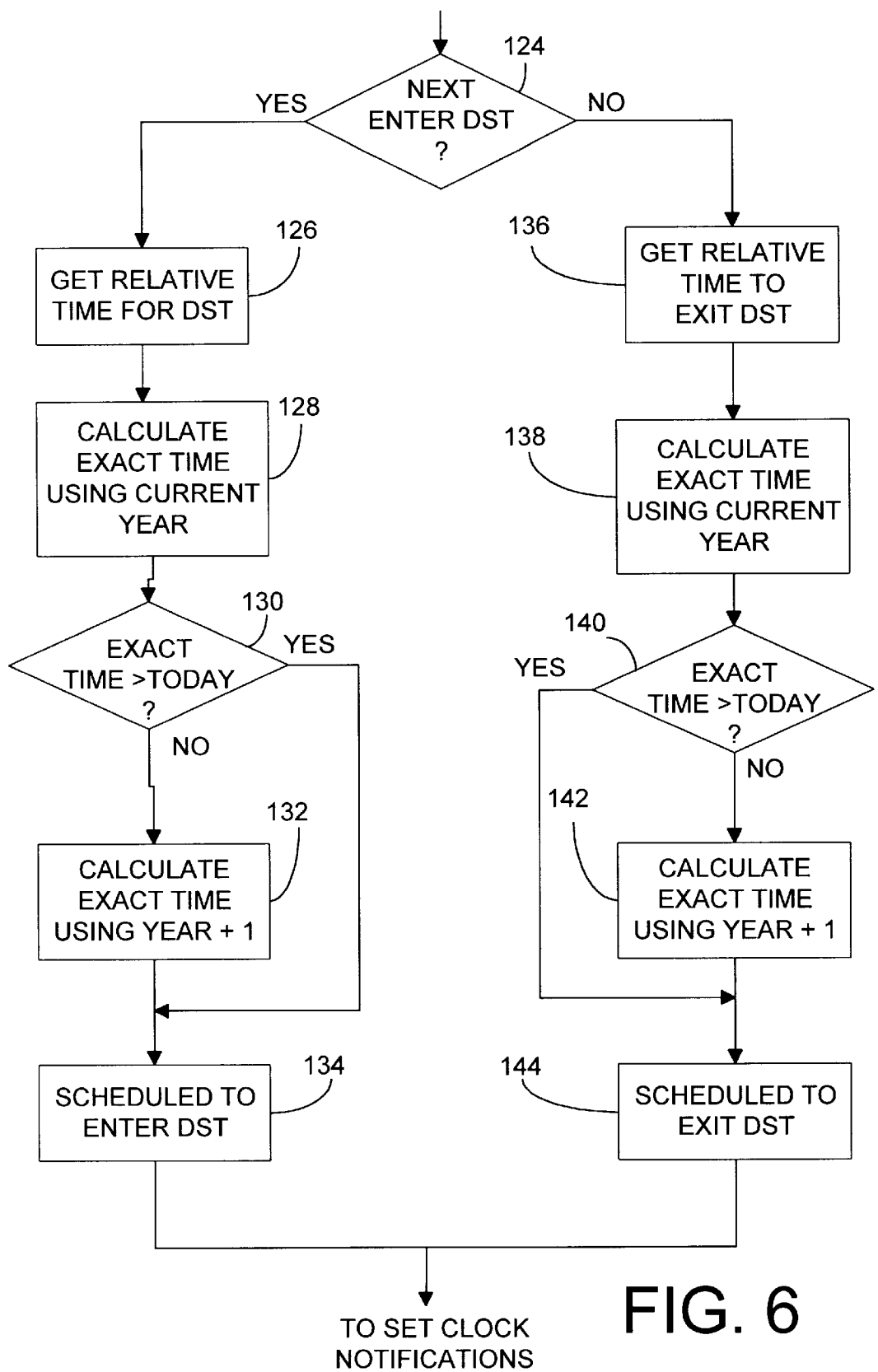
FIG. 6 is a flow diagram illustrating one preferred embodiment of how the clock notification scheduling system illustrated in FIG. 3 processes daylight savings time events.

FIG. 6 is a more detailed flow diagram illustrating how a next daylight savings time action is determined (as discussed with respect to block 114 in FIG. 5). The system first determines whether the next transition is a transition into daylight savings time, or a transition out of daylight savings time into standard time. This is indicated by block 124.

Assuming that the next action is to transition into daylight savings time, the system examines the time zone information structure stored in the registry maintained by the operating system. In one preferred embodiment, this information is examined by calling an API entitled CESETTIMEZONEINFORMATION. This allows the notification scheduling system to examine time zone information stored in the registry, which was initially input into the registry by the user or another programmer through the clock application program. Pertinent information stored in the registry includes the particular time zone within which the user desires the clock application to operate, and the particular city entered by the user. Also, the registry maintains a relative date and time on which daylight savings time transitions are to occur.

The relative date is not an exact date, such as Apr. 28, 1999, but rather a relative date, such as the fourth Sunday in April at 2:00 a.m. This information is intended to convey the relative date upon which daylight savings time is to be entered in the particular time zone and locality which is also stored on the registry. Obtaining the relative date and time for entry into daylight savings time is indicated by block 126.

The system then calculates the exact time and date for entry into daylight savings time, based on the relative time and date using the current year. This can be done in any suitable way, such as by accessing calendaring information for the current year. This is indicated by block 128.

The system then determines whether the exact date calculated for entry into daylight savings time has already occurred in the present year. For instance, assume the current time is standard time, such that the next event will be to enter daylight savings time. Assume also that it is currently in the fall of the year such that for the present year the transition into daylight savings time has already occurred. Then the exact date calculated for the current year in block 128 will be in the past. This is detected at block 130.

If that is the case, then the system recalculates the exact date and time for entry into daylight savings time using the current year plus one (i.e., for the next subsequent year). This is indicated by block 132. In either case, once the exact date is obtained for the next transition into daylight savings time, that date is stored in the registry such that the system is scheduled to enter daylight savings time at that exact date. This is indicated by block 134.

If, at block 124, it is determined that the next action to be taken is to transition out of daylight savings time (or exit daylight savings time into standard time) then the notification scheduling system obtains the relative date and time upon which this transition is to occur. This is indicated by block 136. Processing from that point forward, through blocks 138, 140, 142 and 144 is substantially the same as that in blocks 128–134, except that the exact date being calculated is that for exiting from daylight savings time rather than entry into daylight savings time. The exact date for transitioning out of daylight savings time is obtained and stored in the registry, as illustrated in blocks 138–144.

Figure 7:
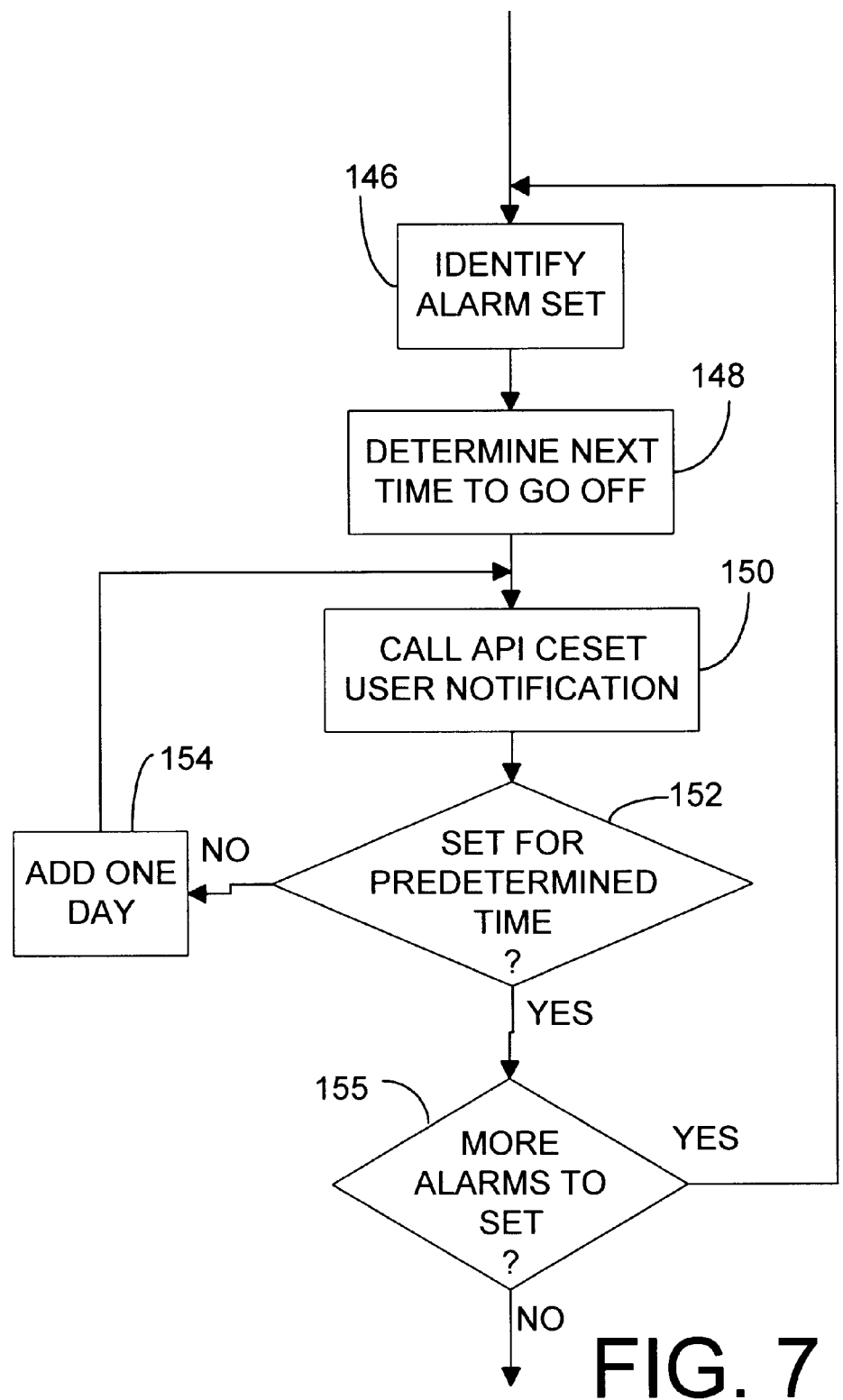
FIG. 7 is a flow diagram illustrating one preferred embodiment of how the clock notification scheduling system schedules alarm notifications in accordance with one aspect of the present invention.

FIG. 7 is a more detailed block diagram illustrating how the clock notification scheduling application in accordance with one preferred embodiment of the present invention schedules the clock notifications for a predetermined time into the future (as illustrated with respect to block 116 in FIG. 5). First, the notification scheduling application identifies all of the alarms which have been set by the user to go off during the day. The user typically sets the alarms through the clock program. Those alarms are preferably identified by examining the registry maintained by the operating system which holds the identity of those alarms. This is indicated by block 146.

Next, the notification scheduling application determines the next instance at which each of those alarms is to be actuated. This is indicated by block 148.

Once this is determined, the notification scheduling application calls an application programming interface exposed by the operating system known as CESETUSERNOTIFICATION to enter that alarm in the notification database such that the particular alarm is scheduled to go off at the identified time on the current day. This is indicated by block 150. Next, the system determines whether that alarm has been reset to go off every day for the predetermined time period into the future. In the preferred embodiment, the predetermined time period is one week. Therefore, if the particular alarm has only been set to go off for the current day, the system determines that it has not been set to go off each day for the predetermined time period, and adds one day to the time determined in block 148. This is indicated in blocks 150 and 152.

The system then calls API CESETUSERNOTIFICATION again to schedule the alarm to go off the next day. This process is continued until the system determines that the particular alarm has been set to go off every day, at the same time, for the entire predetermined time period into the future. After that particular alarm has been set for the predetermined time period, the system determines whether any additional alarms need to be scheduled for the predetermined time period. If so, the process is repeated for each of those alarms until they have all been scheduled. This is indicated by block 154.

Figure 8:
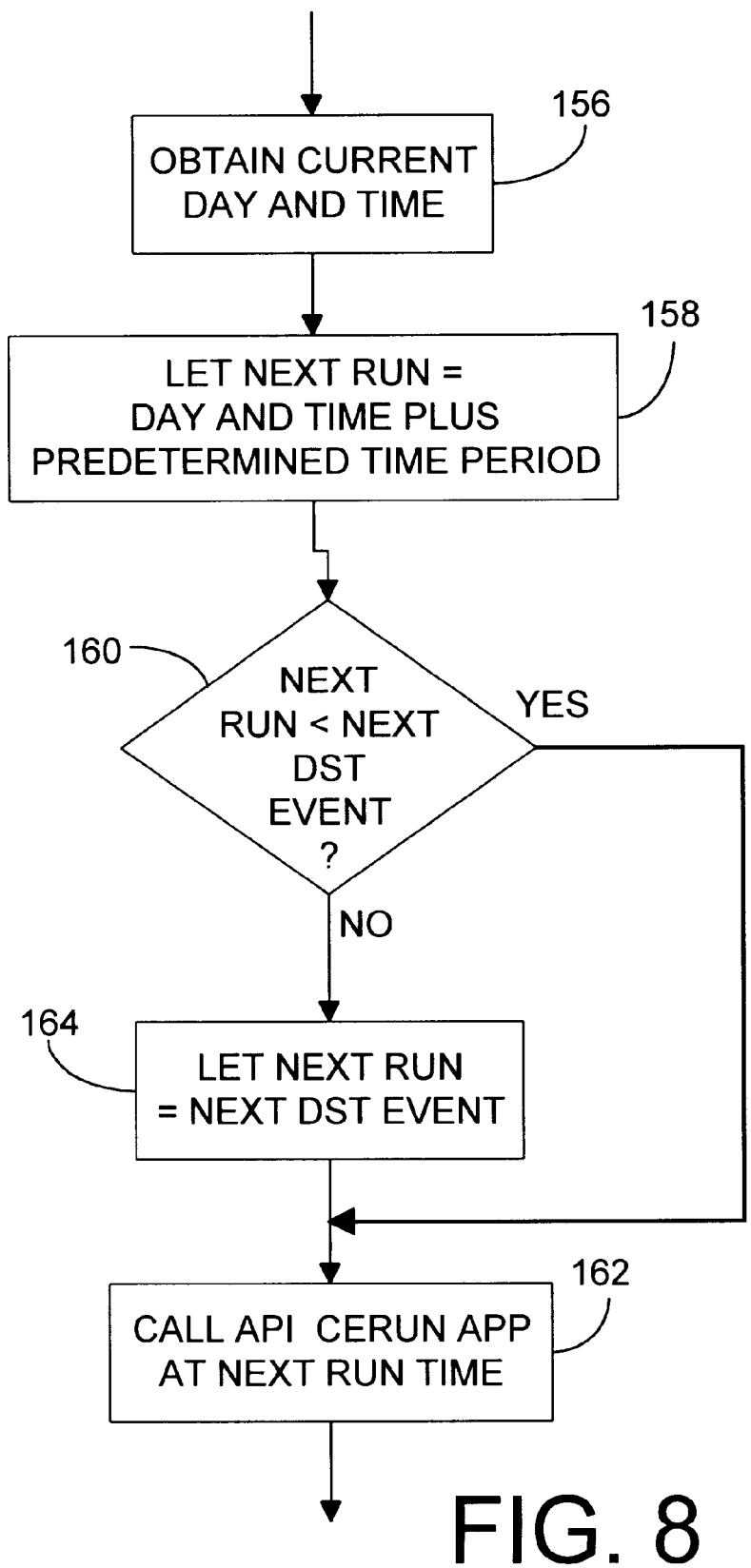
FIG. 8 is a flow diagram illustrating how the clock notification scheduling system schedules itself to run again in accordance with one aspect of the present invention.

FIG. 8 is a more detailed flow diagram illustrating how the clock notification scheduling application schedules itself to run at some time in the future, in accordance with one aspect of the present invention (and as discussed with respect to block 118 in FIG. 5). First, the notification scheduling application obtains the current day and time from the clock application. This is indicated by block 156.

The notification scheduling application then calculates a next run date for itself by adding a predetermined time period to the current day and time. In other words, if the notification scheduling application has set all clock alarms for the next seven days, it must schedule itself to run again in seven days so that all of the alarms can be reset for the following week, and so that no alarms are skipped. This is indicated by block 158.

The notification scheduling application then determines whether the next run date is prior to the next daylight savings time transition which is to occur. Recall that, in a preferred embodiment, the present application runs each time a daylight savings time transition occurs so that the clock on mobile device 3 can be reset, so that user notifications can be reset, and so that the next daylight savings time transition dates can be calculated. If the next run date is determined to be prior to the next daylight savings time transition, then the present application simply schedules itself to run again at the next run date. This is accomplished by calling the API CERUNAPPATTIME and providing the next run date as the time. This is indicated by blocks 160 and 162.

However, if, in block 160, it is determined that the next daylight savings time transition is prior to the next run date, then the application determines that it must set itself to run again before the next predetermined time period has elapsed. In that case, the present application determines that the next run date should actually coincide with the next daylight savings time transition. The present application then calls the API CERUNAPPATTIME to schedule itself to run at the next daylight savings time transition, instead of at the end of the next predetermined time period. This is indicted by blocks 164 and 162.

In the preferred embodiment, the present invention not only operates to schedule clock alarm notifications but also operates to schedule calendar notification in a similar manner. In other words, the present invention only schedules calendar notifications for a predetermined time period into the future such that all calendar notifications do not need to be maintained in the notification database for an infinite time into the future. As with the clock notification scheduling feature of the present invention, the calendar notification scheduling feature defines a predetermined time period into the future as the window within which all calendar notifications are to be set. However, the calendar notification window can be widened or narrowed based on certain items of information, as will be discussed in greater detail below.

Figure 9:
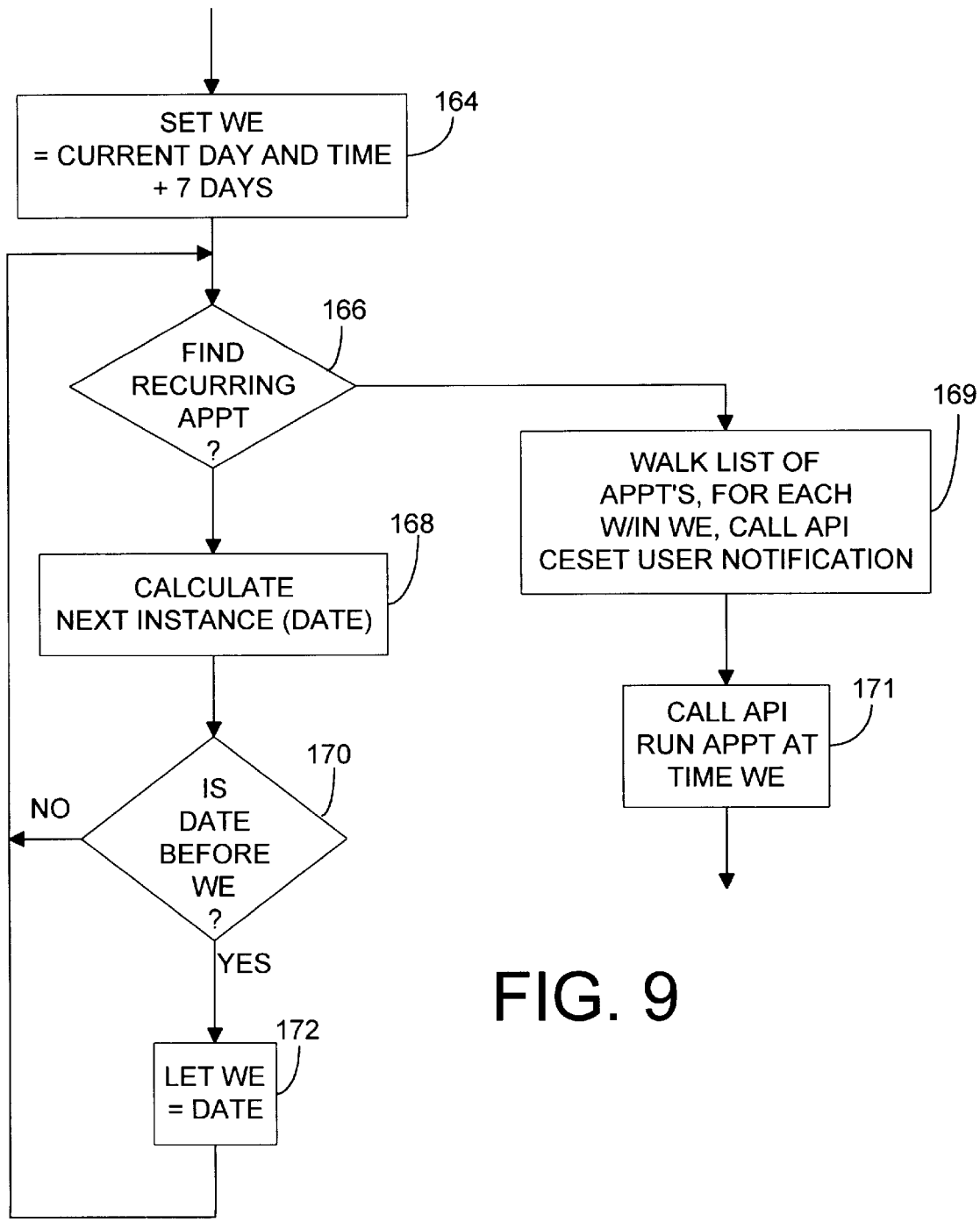
FIG. 9 is a block diagram illustrating the operation of a calendar notification scheduling system in accordance with one aspect of the present invention.

FIG. 9 is a flow diagram illustrating the operation of the calendar notification scheduling system in accordance with one preferred embodiment of the present invention. FIG. 9 assumes that the calendar notification scheduling application in accordance with the present invention has just run and scheduled all calendar notifications for a predetermined time into the future (which is assumed for the sake of simplicity in FIG. 9 to be seven days). Thus, the calendar notification scheduling system first sets the end of the window (the window end is defined as the end of the predetermined time period into the future as modified by events discussed below and is designated by the letters WE in FIG. 9) to be the current day and time plus seven days. This is indicated by block 164.

The system next begins to walk through the list of appointments maintained by the calendar or scheduler application to find any recurring appointments. Recurring appointments are those appointments which occur periodically in a predefined manner, such as every Monday, the first Wednesday of every month, etc. Locating recurring appointments is indicated by block 166.

If a recurring appointment is located, the calendar notification scheduling system calculates the next instance (DATE) at which that recurring appointment is to occur. If that date occurs before the window end (WE) calculated in block 64, then the window is narrowed such that the window end (WE) coincides with the date of the next instance of the recurring appointment. If the date of the next instance of the identified recurring appointment occurs after the window end (WE), then that recurring appointment is simply written to the list of appointments and does not affect the window end (WE). This is indicated by blocks 168, 170 and 172.

The calendar notification scheduling system then looks for additional recurring appointments. For each recurring appointment identified, the calendar notification scheduling system determines whether the window end (WE) needs to be narrowed such that the window end (WE) coincides with the date of the next instance of each recurring appointment. Thus, after considering all recurring appointments in the appointment list, the calendar notification system will have set the window end (WE) to coincide with either the end of the next predetermined time period, or the earliest instance of a recurring appointment.

As soon as no further recurring appoints are found in block 166, the calendar notification scheduling system in accordance with one preferred embodiment of the present invention then walks the list of appointments created by the calendaring or scheduling application in order to identify each appointment which is to occur within the time period specified by WE. For each of those appointments, the calendar notification scheduling system calls an API exposed by the operating system entitled CESETUSERNOTIFICATION in order to schedule the user notification associated with each appointment to occur within WE. This is indicated by block 168.

Once all user notifications for appointments within WE have been scheduled, the calendar notification scheduling application then preferably schedules itself to run again at the end of the window defined by WE. In order to do this, the calendar notification scheduling application calls the API RUNAPPATTIME and specifies the time as WE such that the operating system will again launch the calendar notification scheduling application at the time specified by WE. This is indicated by block 170.

It should be noted that, in accordance with one preferred embodiment of the present invention, the calendar notification scheduling application will not only run at the time specified by WE, but it will also run upon the occurrence of a Restore operation, upon power disruption to mobile device 3, or upon a change to the time or date then being maintained by mobile device 3.

Figure 10:
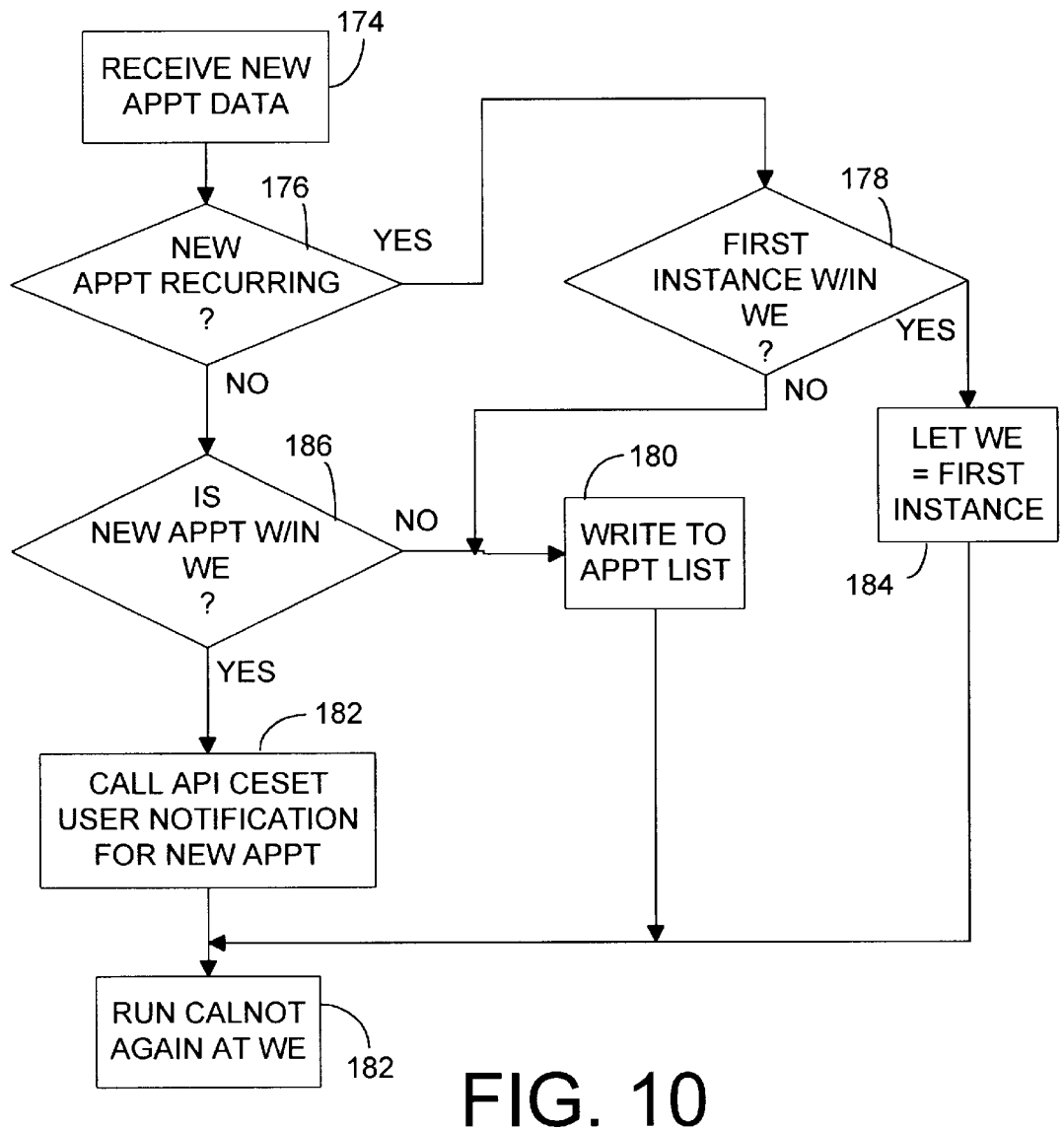
FIG. 10 is a block diagram illustrating how the calendar notification scheduling system handles new appointments in accordance with one aspect of the present invention.

FIG. 10 illustrates another feature in accordance with one preferred embodiment of the present invention. FIG. 10 is a flow diagram which illustrates how appointments are handled, if the appointments are added after the last time which the calendar notification scheduling application has run, but before it is next scheduled to run (i.e., before WE). First, the data provided by the user is received by the calendar application, or scheduling application. That data typically identifies whether the appointment is a recurring appointment. This is indicated by block 174.

If the appointment is a recurring appointment, then it is determined whether the first instance of that appointment is within the current time specified by WE. This is indicated by blocks 176 and 178. If not, the first instance of the appointment is simply written to the appointment list and the calendar notification scheduling application is run again at WE. This is indicated by blocks 180 and 182. If the appointment is a recurring appointment, and the first instance is within the time period specified by WE, then WE is changed to coincide with the first instance of that recurring appointment. This is indicated by block 184. The calendar notification scheduling application is then run at the new WE, as indicated by block 182.

If, at block 176, it is determined that the new appointment is not a recurring appointment, then it is determined whether the appointment is within the time specified by WE. If not, again the appointment is simply written to the appointment list at block 180 and the calendar notification scheduling application is run again at the time specified by WE as indicated at block 182. However, if the new appointment is within the time specified by WE, then the user notification is immediately set for the appointment by calling the API CESETUSERNOTIFICATION for the new appointment. This is indicated by blocks 186 and 188. Again, the calendar notification scheduling application is simply launched again by the operating system at the time specified by WE, as indicted by block 182.

In accordance with another preferred aspect of the present invention, the calendar notification scheduling application is sensitive to time zone changes. Therefore, if the user changes the time zone information stored in the registry maintained by the operating system, this causes the calendar notification scheduling application to run again and reset all of the alarms associated with appointments, the times of which will change based upon the new time zone information entered by the user. In addition, in one preferred embodiment, the calendar notification scheduling application checks to determine whether the calendar application is then running. If so, the calendar notification scheduling application calls an appropriate API exposed by the calendar application causing the calendar application to update the user interface then being provided by the calendar application such that the actual time corresponding to the new time zone entered by the user will be displayed to the user.

Also, it should be noted that the description above has proceeded primarily with respect to clock and calendar notifications. However, the present invention also contemplates resetting other notifications, such as those associated with tasks or task lists which are entered by the user. In other words, the user may desire to have a user notification provided to indicate that certain tasks are to be done or performed by the user. The present system preferably updates and maintains the user notifications associated with those tasks in a similar fashion to that for appointments.

Further, in accordance with the present invention, the notification scheduling applications preferably reschedule themselves to run within a very short time period if they have failed. In other words, if the calendar notification scheduling application has failed, for some reason, it preferably reschedules itself to run within the next five minutes and continues to do this until it succeeds.

Further, in accordance with one preferred embodiment of the present invention, the calendar and clock notification scheduling applications, upon being launched, check to determine whether another instance of the same application is already running. In other words, certain events can trigger the launching of multiple instances of the notification scheduling applications within seconds of each other. If that occurs, rather than executing the entire application again, the application determines that one instance of the application is already running, and terminates itself. This substantially alleviates any problems associated with running multiple instances of the same application at the same time.

Thus, it can be seen that the present invention provides an efficient and economic way for maintaining notifications, such as clock and calendar notifications, without missing any alarms or notifications, yet at the same time significantly limiting the number of alarms and notifications in the notification database. Also, the present invention provides for the launching of the notification scheduling applications only on a periodic basis. These features keep the amount of memory required by the applications, the amount of power required by the applications, and the amount of memory required to maintain the notifications, significantly smaller than would otherwise be the case.

Although the present invention has been described with reference to preferred embodiments, workers skilled in the art will recognize that changes may be made in form and detail without departing from the spirit and scope of the invention.

What is claimed is:

1. A method of maintaining a notification database in a mobile device, the mobile device including a notification system which accesses entries in the notification database and causes user notifications to be presented based on the entries in the notification database, the method comprising:

running a notification scheduling program at a predetermined time, the notification scheduling program being configured to perform the following steps;
   obtaining information indicative of a plurality of notifications to be presented in the future;
   entering in the notification database only those notifications, of the plurality of notifications, which are to be presented within a limited predetermined time period; and
   scheduling the notification scheduling program to be rerun in response to expiration of the limited predetermined time period.

2. The method of claim 1 and further comprising:
   rerunning the notification scheduling program at the end of the limited predetermined time period; and
   repeating the steps of obtaining, entering and scheduling.

3. The method of claim 1 wherein the mobile device includes a clock, and further comprising:
   scheduling the notification scheduling program to be run in response to the occurrence of a daylight savings time transition, the daylight savings time transition including one of entering daylight savings time and exiting daylight savings time.

4. The method of claim 3 and further comprising:
   prior to obtaining information indicative of a plurality of notifications, determining whether a daylight savings time transition has occurred since the notification scheduling program was last run; and
   if so, adjusting the clock based on the daylight savings time transition.

5. The method of claim 4 wherein determining whether a daylight savings time transition has occurred comprises:
   accessing clock information indicative of whether the clock is set according to daylight savings time;
   accessing daylight savings time parameter information indicative of whether a current date and time are within daylight savings time; and
   comparing the clock information with the daylight savings time parameter information to determine whether a daylight savings time transition has occurred.

6. The method of claim 3 wherein the notification scheduling program is configured to perform the step of determining a next daylight savings time transition.

7. The method of claim 6 wherein determining a next daylight savings time transition comprises:
   obtaining a relative time for the next daylight savings time transition;
   determining an exact date for the next daylight savings time transition in a current year;
   comparing the exact date with a current date to determine whether the exact date is prior to the current date; and
   if so, determining a second exact date for the next daylight savings time transition in a next subsequent year.

8. The method of claim 7 and further comprising:
   prior to obtaining a relative time, determining whether the next daylight savings time transition comprises entering or exiting daylight savings time.

9. The method of claim 1 wherein the notifications comprise clock alarms and wherein obtaining information indicative of notifications comprises:
   accessing information indicative of a clock alarm to be actuated;
   identifying an alarm time at which the clock alarm is to be actuated;
   entering a user notification corresponding to the clock alarm and the alarm time in the user notification database;
   adding a day to the alarm time; and
   repeating the steps of entering a user notification and adding a day until a number of days corresponding to the limited predetermined time period has been reached.

10. The method of claim 9 and further comprising:
   accessing information, identifying an alarm time, entering a user notification, adding a day and repeating, for each clock alarm to be actuated.

11. The method of claim 6 wherein scheduling the notification scheduling program to be rerun comprises:
   comparing a time corresponding to expiration of the limited predetermined time period with the next daylight savings time transition; and
   scheduling the notification scheduling program to be rerun at an earlier occurring of the expiration of the limited predetermined time period and the next daylight savings time transition.

12. The method of claim 1 wherein the notifications comprise calendar notifications including single event notifications and recurring notifications, and wherein scheduling the notification scheduling program to be rerun comprises:
   setting a next run date to coincide with a current date plus a first predetermined time period; and
   scheduling the notification scheduling program to be rerun at the next run date.

13. The method of claim 12 wherein entering in the notification database comprises:
   identifying appointments for which notifications are to be presented prior to the next run date; and
   entering the notifications in the notification database.

14. The method of claim 13 wherein scheduling the notification scheduling program to be rerun comprises:
   identifying a recurring appointment having an instance for which a notification is to be presented prior to the next run date;
   adjusting the next run date to coincide with a date of the instance of the recurring appointment; and
   repeating the steps of identifying and adjusting for each recurring appointment identified.

15. The method of claim 1 wherein the mobile device includes a time zone data store storing data indicative of a time zone and further comprising:
   re-running the notification scheduling program in response to a change in the time zone data.

16. A mobile device comprising:
   a notification database configured to store entries indicative of user notifications to be presented;
   a notification system configured to access the notification database and present the user notifications based on the entries in the notification database;
   a notification scheduling program configured to place the entries in the notification database by:
      obtaining information indicative of notifications to be presented in the future;
      entering in the database the notifications to be presented in the future which are to be presented within a limited predetermined time period; and
      scheduling the notification program to be rerun at a next run date which coincides with expiration of the limited predetermined time period.

17. The mobile device of claim 16 wherein the notification scheduling program is configured to determine whether any notifications correspond to recurring appointments, a next instance of which is to occur prior to expiration of the limited predetermined time period, and to reset the limited predetermined time period to correspond to a date on which the next instance of the recurring appointment is to occur.

18. The mobile device of claim 16 wherein the notification scheduling program is configured to obtain information indicative of clock alarm notifications, and make entries in the notification database corresponding to the clock alarm notifications for each day within the limited predetermined time period.

19. The mobile device of claim 18 wherein the notification scheduling program is configured to, prior to entering, determine a date corresponding to a next daylight savings time transition and to set the limited predetermined time period to correspond to a first occurring of a first predetermined time period and the next daylight savings time transition.

20. The mobile device of claim 19 wherein the notification scheduling program is configured to schedule itself to rerun at the first occurring of the first predetermined time period and the next daylight savings time transition.

21. The mobile device of claim 19 wherein the notification scheduling program is configured to determine the date corresponding to the next daylight savings time transition by obtaining a relative day and time corresponding to the transition, determining an exact date and time corresponding to the transition for a current year, determining whether the exact date and time is prior to a current date, and redetermining an exact date and time corresponding to the transition for a next year subsequent to the current year.

* * * * *